Figure 1:
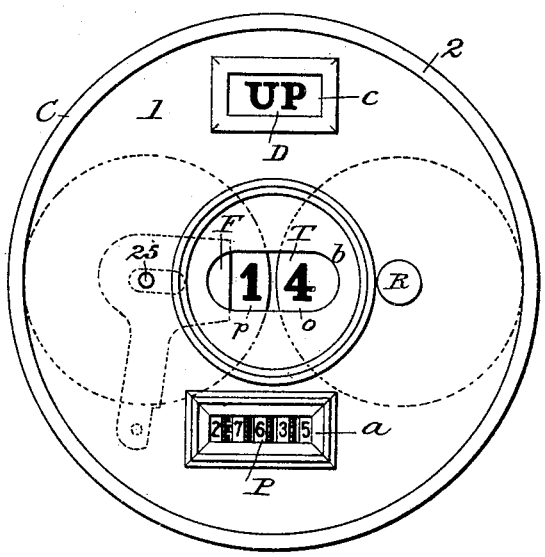

No. 700,703. Patented May 20, 1902.
A. E. NIELSEN.
FARE REGISTER.
(Application filed Feb. 7, 1899. Renewed Oct. 29, 1901.)

(No Model.) 4 Sheets—Sheet 1.

Witnesses:
Jno. Imrie
Arthur C. Fowler

Inventor:
Anton E. Nielsen
Attorney.

No. 700,703. Patented May 20, 1902.
A. E. NIELSEN.
FARE REGISTER.
(Application filed Feb. 7, 1899. Renewed Oct. 29, 1901.)
(No Model.) 4 Sheets—Sheet 2.

Witnesses:
Jno Innie
Arthur C. Fowke.

Inventor;
Anton E. Nielsen
Attorney.

No. 700,703. Patented May 20, 1902.
A. E. NIELSEN.
FARE REGISTER.
Application filed Feb. 7, 1899. Renewed Oct. 29, 1901.
(No Model.) 4 Sheets—Sheet 3.

Witnesses:
Inventor:
Anton E. Nielsen
Attorney.

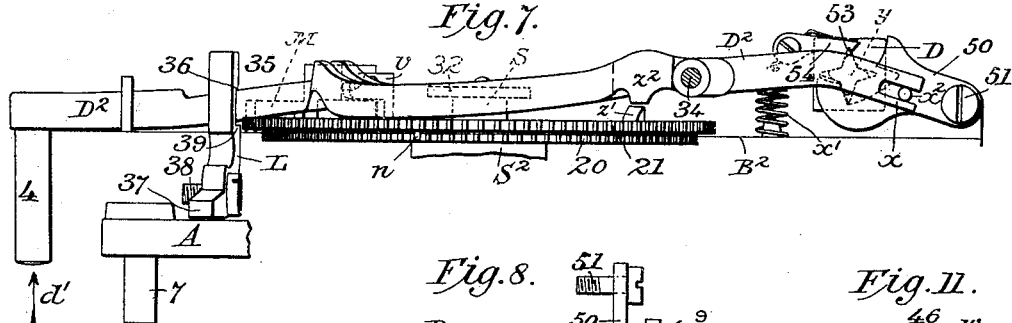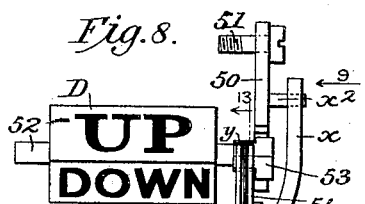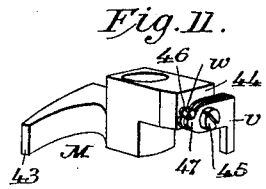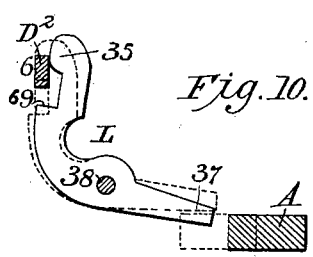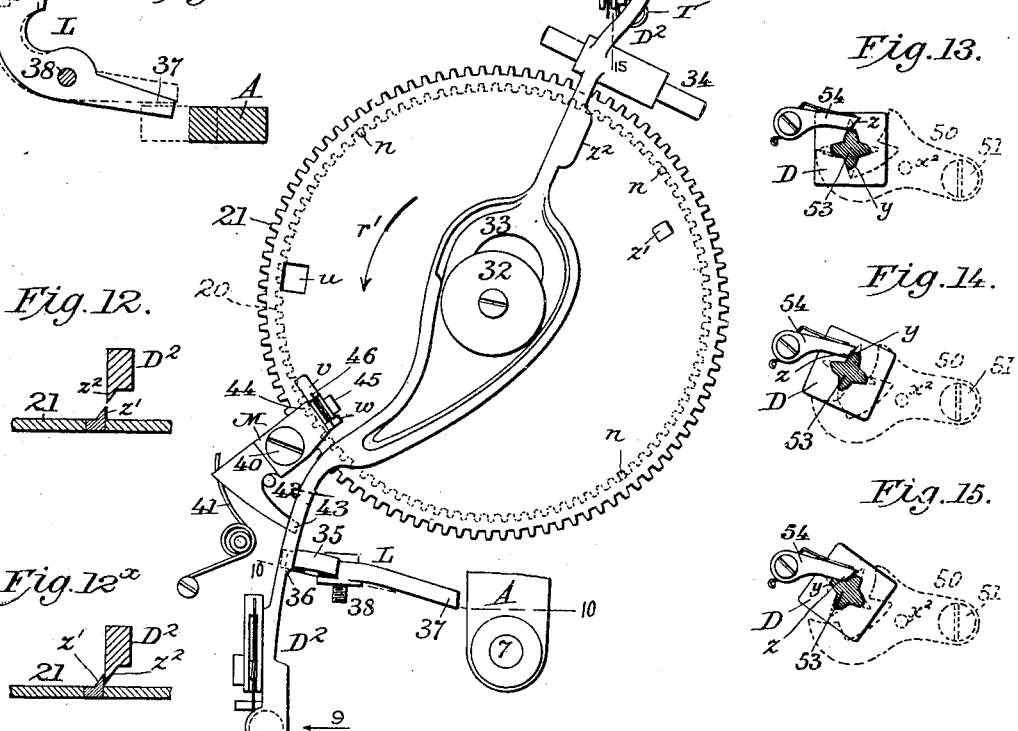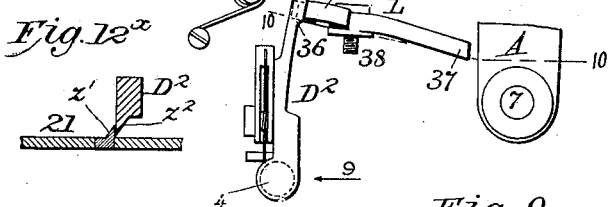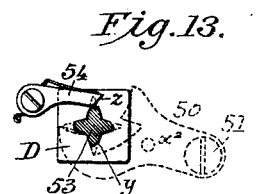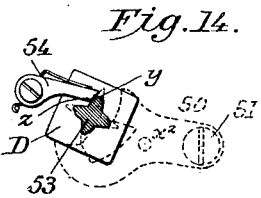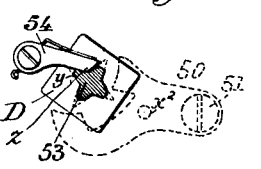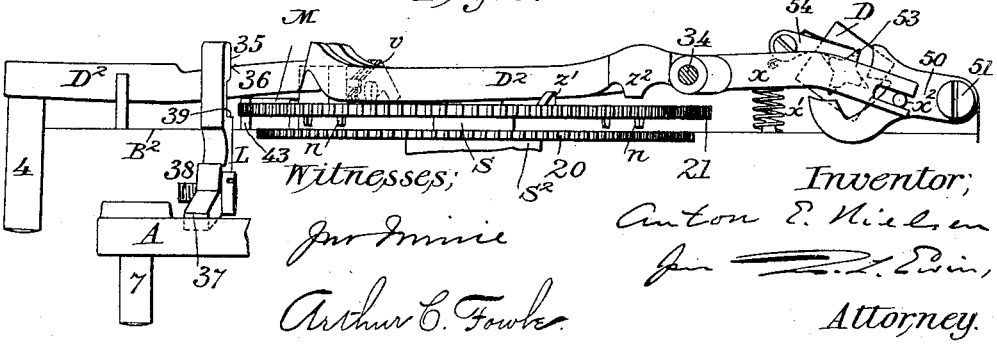

UNITED STATES PATENT OFFICE.

ANTON E. NIELSEN, OF BROOKLYN, NEW YORK, ASSIGNOR TO STERLING SUPPLY & MANUFACTURING COMPANY, OF NEW YORK, N. Y., A CORPORATION OF NEW YORK.

FARE-REGISTER.

SPECIFICATION forming part of Letters Patent No. 700,703, dated May 20, 1902.

Application filed February 7, 1899. Renewed October 29, 1901. Serial No. 80,441. (No model.)

*To all whom it may concern:*

Be it known that I, ANTON E. NIELSEN, a citizen of the United States of America, and a resident of the borough of Brooklyn, in the city of New York and State of New York, have invented a new and useful Improvement in Fare-Registers, of which the following is a specification.

This invention as a whole consists in an improved fare-register designed as an improvement on the "cash-section" or main duplex register forming part of the subject-matter of United States Letters Patent No. 547,981, for improvement in fare-registers, granted October 15, 1895, to John Bradbury Benton and now owned by the Sterling Supply and Manufacturing Company, for whom the present improvement was made. Said duplex register, like others of its class, comprises what may be termed a "resettable" trip-register for registering the passengers or fares of each trip and a permanent register which totalizes the number of passengers or fares of successive trips and can only be reset by taking apart the register. The specific trip-register of said duplex register is characterized by rotary dial-plates or register-wheels which rotate side by side immediately behind the face-plate or fixed dial of the register, in a plane parallel to that of the latter, and are read through an index-window in said dial. Other characteristics of said duplex register are a longitudinally-movable rotary shaft extending forwardly and normally held back by spring-pressure, separable connections between the main actuator and trip-register broken by the forward movement of said shaft, means for so disconnecting the trip-register and for resetting it to zero while disconnected, means for maintaining the disconnection of the trip-register until the latter is returned to its zero position, means for stopping the trip-register at zero when it is reset, and a direction-indicator actuated by the disconnecting device.

The present invention relates more particularly to those features of the register last mentioned; and it consists in certain novel combinations of parts hereinafter described and claimed, having the following objects—viz., to lock the disconnecting device and the means for actuating the direction-indicator when the main actuator is not in normal position, and thus to insure locking the latter and therewith the bell mechanism and the permanent register, either or both, while the trip-register is disconnected; to effect the two locking operations by one and the same simple device; to render such locking device springless; to form an effective zero-stop in a new and convenient manner, and to facilitate and insure the correct actuation of the direction-indicator mechanism with a minimum of movement on the part of its actuator.

Four sheets of drawings accompany this specification as part thereof.

Figure 2:
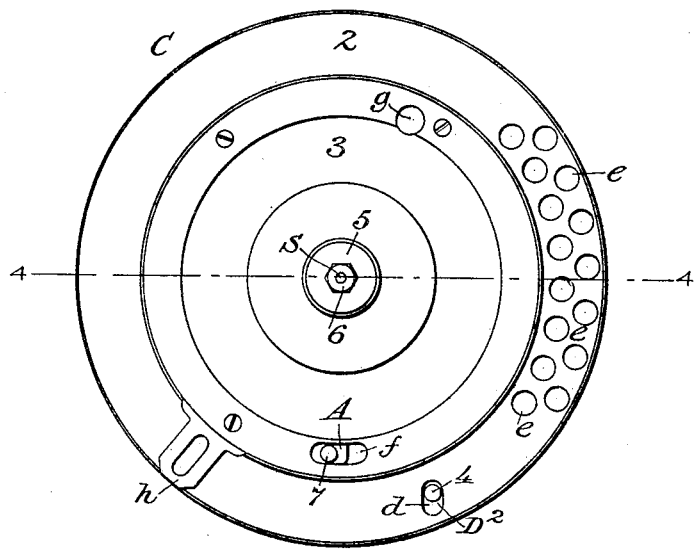
Figure 3:
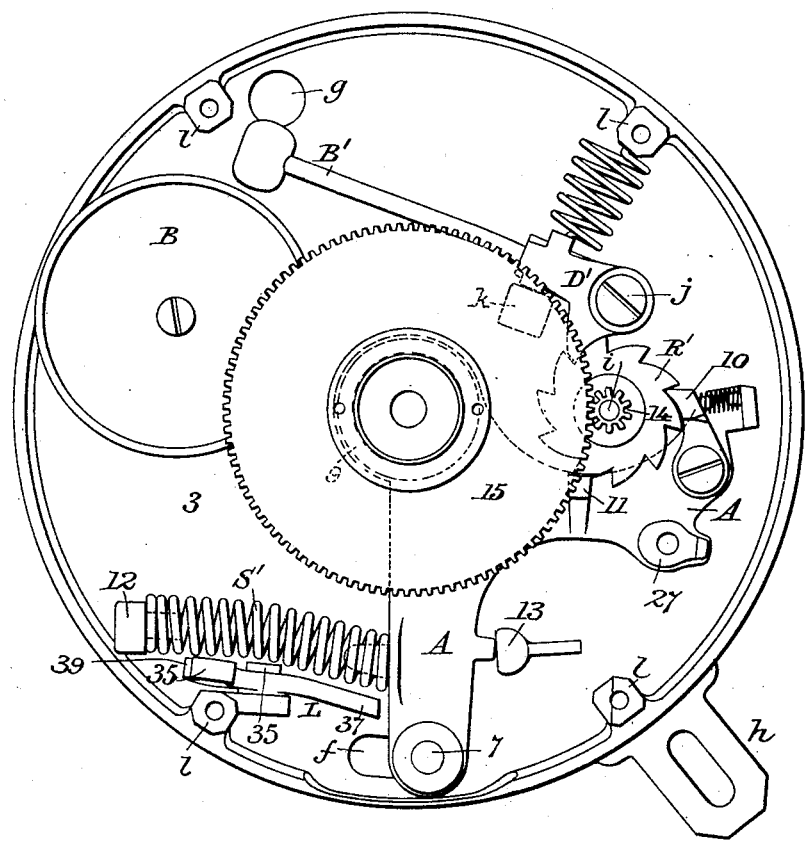
Figure 4:
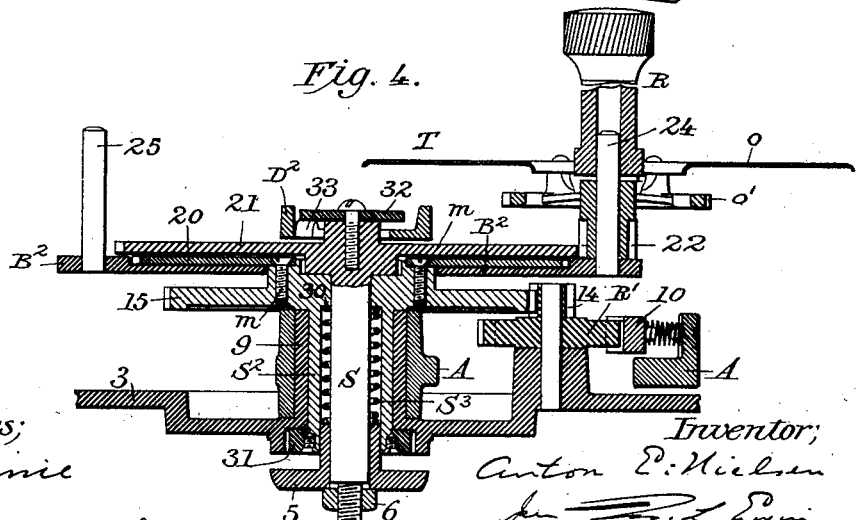
Figure 5:
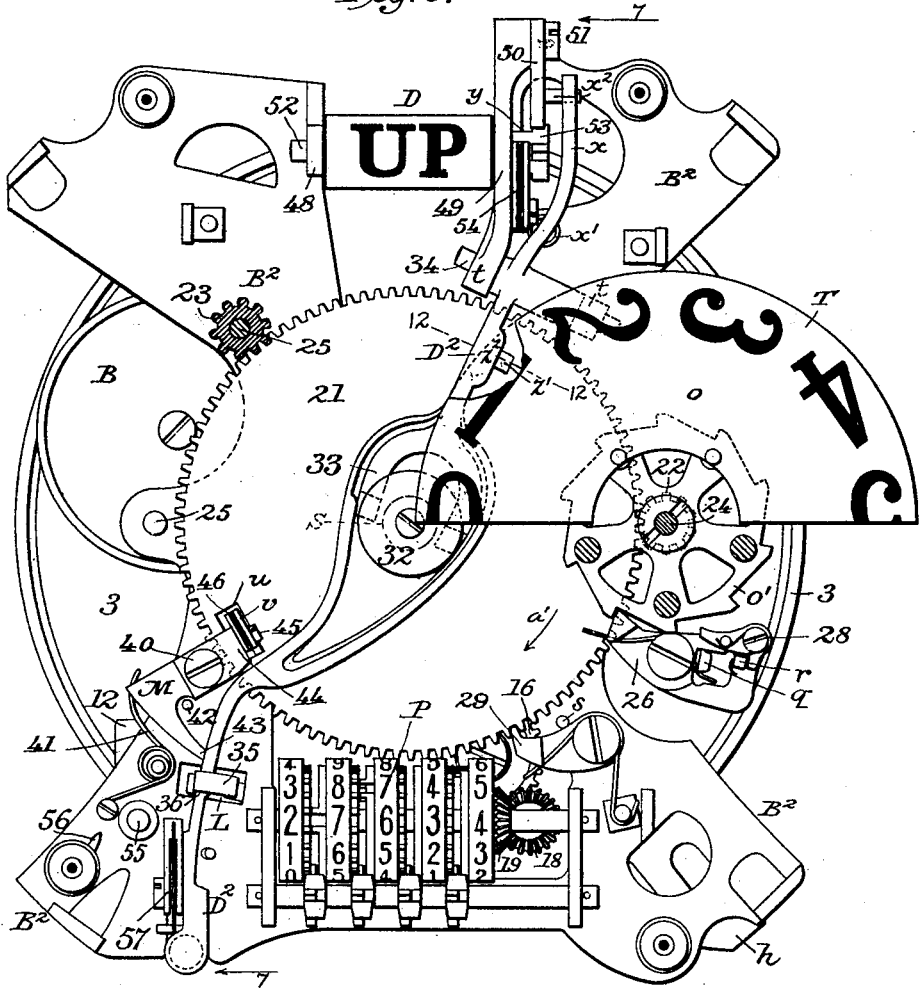
Figure 6:
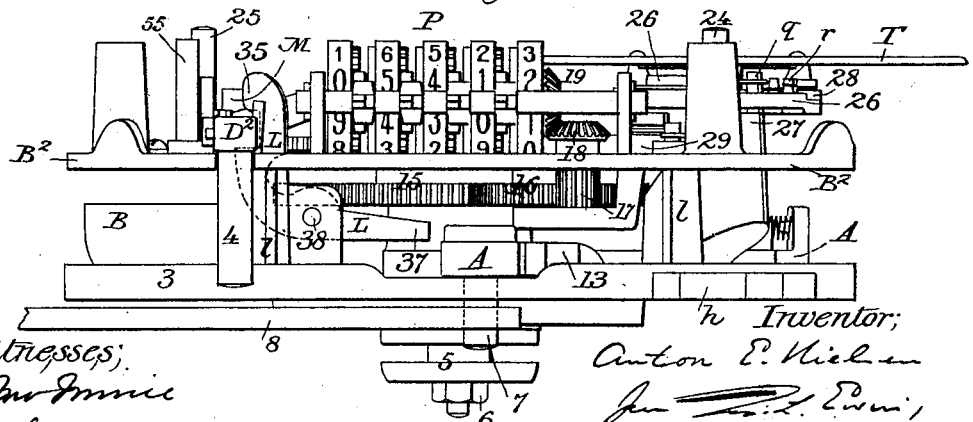

Figure 1 of the drawings is a face view of said improved register. Fig. 2 is a back view of the same dismounted or unhung. Fig. 3 is a face view of the back plate and parts mounted thereon, showing the main actuating mechanism and bell mechanism. Fig. 4 is a partial section on the line 4 4, Fig. 2. Fig. 5 is a face view behind the face-plate or dial with some of the parts omitted or broken away. Fig. 6 is an edge view projected from Fig. 5. Fig. 7 is a fragmentary side view represented by the arrows 7 7, Fig. 5, showing the disconnecting device and its appurtenances, including the direction-indicator mechanism, in their normal positions of rest, as in Figs. 5 and 6. Fig. 8 is a diagrammatic face view of the parts shown in Fig. 7, showing the large gear of the trip-register advanced ten points by registrations and disconnected preparatory to being reset to zero and the direction-indicator partially turned. Fig. 9 is an edge view similar to Fig. 7 of said parts as they appear in Fig. 8. Fig. 10 represents a section on the line 10 10, Fig. 8. Fig. 11 is a perspective view of one of the parts as shown in Fig. 5 detached. Fig. 12 represents a section on the line 12 12, Fig. 5. Fig. 12$^\times$ is a like section through the zero-stop as it appears at the instant when the trip-register returns to zero; and Figs. 13, 14, and 15 are a series of sections at 13 to 15, Fig. 8, illustrating the movement of the direction-indicator from the position in which it is shown in Figs. 5 and 7 to the position in which it is shown in Figs. 8 and 9.

Like letters and numbers refer to like parts in all the figures.

Those parts of the improved register exposed to view externally, as shown in Figs. 1 and 2, include a casing C, which may be of any known or improved construction, but preferably comprises a circular face-plate or fixed dial 1 of enameled sheet metal, a sheet-metal rim 2, and a cast-iron back plate 3.

Through glazed sight-openings or index-windows $a$, $b$, and $c$, Fig. 1, in the dial 1 the readings of a permanent register P, preferably of the cylinder type, a trip-register T of the type hereinbefore described, together with its "flipper" F, and a direction-indicator D are exposed to view, and a resetting-knob R projects in front of the dial 1 for resetting the trip-register.

Through a slot $d$, Fig. 2, in the shouldered rear part of the rim 2 the push-pin 4 of a disconnecting device $D^2$ protrudes, and said part is further provided with sound-escape holes $e$. The rear end of a forwardly-movable shaft S, Fig. 2, with which said disconnecting device coacts, appears at the center of the back plate 3, provided simply with a stop-disk 5 to limit its forward movement and means 6, preferably in the form of a screw-nut, for attaching said disk. Through a slot $f$ in the back plate concentric with said shaft S the main actuator A can be seen and its stud-pin 7 protrudes, and the back plate is further provided with a hook-admitting hole $g$ and a radially-projecting hasp $h$ for interlocking the register in a known way with a hanging board or frame and with a link 8, Fig. 6, of an appropriate "ringing device" to coact with said stud-pin 7. Said actuator A, as best seen in Figs. 3, 4, and 6, is in the form of a strong bell-crank lever fulcrumed on a central hollow boss 9 upon the back plate 3 and carries at its inner extremity a spring-pressed pawl 10, which drives a ratchet-wheel R', and a brake projection 11 to prevent overmovements of said ratchet-wheel by contact therewith. The actuator is acted on by a strong spring S', having its abutment 12 on the back plate, and the effective movements of the actuator produced by the reaction of said spring are limited by a stop 13 upon the back plate.

The ratchet-wheel R' performs its first function as an element of the bell mechanism, Fig. 3, where it coacts with a spring-pressed detent-pawl D' and a bell-hammer B', rigidly united and working as a single part to control the movements of said ratchet-wheel for registering purposes and to strike the bell B after each registration. Said ratchet-wheel R' and detent-pawl D' are mounted, respectively, on a stud-shaft $i$ and a pivot $j$, projecting forwardly from the back plate 3, which is further provided in this connection with a stop $k$ to limit the free movement of the bell-hammer B' toward the bell B.

A pinion 14, carried by the ratchet-wheel R' and both of them preferably of ten teeth, meshes with a large gear 15, preferably of one hundred teeth, which is fast on a sleeve-shaft $S^2$, Fig. 4, surrounding said shaft S within said boss 9, and said gear 15 through an idle wheel 16, Fig. 5, pinion 17, Fig. 6, and bevel-gears 18 and 19 drives the units-wheel of the permanent register P, which register is of known construction and requires no further description. The permanent register, with its said gearing 16 to 19, is mounted on a spider-plate or bridge $B^2$, that is parallel with the back plate 3 and connected therewith by posts $l$, Figs. 3 and 6, on the latter. Immediately in front of said bridge and preferably recessed into the latter a toothed wheel 20 is fastened by screws $m$ to the hub of said gear 15, which hub projects through or partly through the bridge $B^2$ for this purpose. Immediately in front of said wheel 20 a gear 21 of larger diameter, but together with said toothed wheel of the same number of teeth as said gear 15, is carried by the front end of the shaft S and is normally interlocked with said toothed wheel, as in Fig. 7, by stud-pins $n$ on its back occupying interdental notches at the perimeter of said wheel 20.

The number and location of the pins $n$ are immaterial; but the pins are necessarily short enough to clear the teeth of the wheel 20 when the shaft S receives its forward movement, as in Fig. 9.

In both positions the gear 21 is in mesh with pinions 22 and 23, Fig. 5, connected, respectively, with the units-wheel $o$ and the tens-wheel $p$, Fig. 1, of the trip-register T in the manner and for the purposes set forth in said Patent No. 547,981, said wheels $o$ and $p$ turning, respectively, on stud-shafts 24 and 25, Figs. 5 and 6, which project from the bridge $B^2$ at diametrically opposite points equidistant from the axis of the shaft S and gear 21. Through said gear 21 and pinions 22 and 23 consequently, when said gear 21 and wheel 20 are interlocked, as aforesaid, each oscillation of the actuator A is transmitted to the trip-register from the main actuating mechanism, Fig. 3, simultaneously with its transmission therefrom to the permanent register P, so that the fares are synchronously registered by the trip-register and permanent register in customary manner. To prevent overmovements of the trip-register, a ratchet-wheel $o'$, Fig. 5, having its teeth running backward as compared with those of the ratchet-wheel R', is interposed between said pinion 22 and said units-wheel $o$ and coacts after each registering actuation with a spring-pressed pawl 26, pivoted to a forward extension 27 of the actuator A, as set forth in said Patent No. 547,981, a stud $q$ on said extension 27 stopping the pawl in effective position when it is periodically withdrawn from contact with said ratchet-wheel $o'$ by the actuator. In the improved register a supplemental spring-pressed pawl 28 is pivoted to said pawl 26, being stopped when out of contact by a stud $r$ on said pawl 26, and coacts with said ratchet-wheel $o'$ as a half-space detent in the resetting operation hereinafter described.

When the gear 21 is in its normal plane, Fig. 7, its teeth are engaged by a spring-pressed dog 29, Fig. 5, pivoted upon the bridge $B^2$ and stopped by a stud $s$ on the latter, said dog limiting the rotation of said gear 21 to the registering actuation represented by the arrow $a'$, Fig. 5. When said gear 21 is disconnected as above, Fig. 9, the entire fare-register is disconnected from the remainder of the mechanism and said wheel 21 is free to be turned backward for resetting the trip-register to zero, as represented by the arrow $r'$, Fig. 8. To provide for so disconnecting the trip-register, the shaft S is held back in its normal position by spring-pressure, as heretofore, but exerted effectively in the new arrangement by a spiral spring $S^3$, Fig. 4, within said sleeve-shaft $S^2$ of the gear 15, between a shoulder 30 in said sleeve-shaft at its front end and said stop-disk 5 at its rear end. A collar 31, Fig. 4, made fast on said rear end of the sleeve-shaft within an enlargement of the bore of said hollow boss 9, prevents the displacement of the shaft $S^2$ and gear 15. The front end of the shaft S is provided with a disk or button 32, Fig. 4, &c., to coact with a fork 33, Fig. 5, &c., within a loop of said disconnecting device $D^2$. This device, as heretofore, is in the form of a lever extending diagonally across the registering mechanism immediately behind the plane of the register-wheels $o$ and $p$ and in front of the gear 21 and having its fulcrum-pin 34 supported between a pair of lugs $t$, Fig. 5, on the bridge $B^2$. Normally, being drawn back by the spring $S^3$, the lever $D^2$ occupies the position in which it is shown in Fig. 7, which see. In the act of disconnecting the trip-register, the actuator A being at rest, as in Figs. 3, 5, 6, and 7, the rounded overhanging end 35 of an L-shaped locking-dog L is cammed aside by a catch portion 36 of the lever $D^2$, coacting therewith, causing the other end 37 of the dog to project in the path of the actuator A behind the plane of the pivot 38 of said dog, so as to preclude any movement of the actuator or of the bell mechanism or permanent register while the trip-register is so disconnected. Normally said dog L is loosely interlocked with said catch portion 36 of the lever $D^2$, as in Figs. 5, 6, and 7, and is held by the contact of the latter with a shoulder 39 on the dog in the position there represented, with said end 37 projecting in front of the actuator A, so as not to obstruct the latter, but so as to be locked by it whenever the actuator is first moved, and thus to lock said lever $D^2$, as in dotted lines in Fig. 10, against any disconnection of the trip-register without first locking the actuator A. An effective double lock is thus formed by a single springless part and its pivot. A slight forward thrust of the push-pin 4 (represented by the arrow $d'$, Fig. 7) moves the lever $D^2$ to the position in which it is shown in Fig. 9 and effects the disconnection of the trip-register, as above described. The disconnection is automatically maintained by means of a lever M, (shown detached by Fig. 11,) which is attached to the bridge $B^2$ by a shouldered pivotal screw 40 and controlled in part by a pressing-spring 41, a stop-stud 42 on the bridge, and the lever $D^2$ itself, against which the toe 43 of said lever M is normally pressed by said spring 41 while said lever $D^2$ is in said normal position, Figs. 5 and 7. When the lever $D^2$ is manually pressed forward, as aforesaid, (arrow $d'$,) the spring 41 presses said toe 43 of the lever M behind said lever $D^2$, as in Figs. 8 and 9, and prevents its return until said lever M is retracted, rendering it unnecessary to continue the pressure on the push-pin 4, as heretofore. The same hand may consequently be used to turn the knob R, Figs. 1 and 4, for resetting the trig-register to zero, (arrow $r'$.)

To automatically release the disconnecting device $D^2$ and restore the connection between the actuating mechanism and the trip-register, the gear 21 is provided with a recess $u$ at a given point and the disconnection-maintaining lever M is formed with a heel end 44, projecting in front of said gear and having a tumbler or dog $v$ pivoted thereto in the path of said recess $u$ by a pintle 45, Fig. 11, and pressed rearwardly by a spring 46, so as to spring into said recess, as in Fig. 5, when the recess is approaching its zero position. By a stop-lug 47, Fig. 11, and a stud-pin $w$ on the dog $v$ and said heel end 44, respectively, the dog is rendered unyielding in the direction in which the gear 21 turns in its resetting movement, (arrow $r'$,) and the dog is thus adapted to transmit the resetting motion of the gear to the lever M, so as to retract the latter and free the lever $D^2$ when the resetting movement is completed, as in Fig. 5. At the succeeding registering actuation the dog $v$ turns on its pivot out of the recess $u$ as the gear 21 turns in the opposite direction, (arrow $a'$,) and it then rides on the surface of the gear, as in Figs. 8 and 9. The two members $z'$ $z^2$ of an effective zero-stop are carried, respectively, by said gear 21 and said disconnecting-lever $D^2$. During the progress of the registering actuations (arrow $a'$) the stop member $z'$ rides clear of the member $z^2$, as in Fig. 12. When the trip-register is disconnected for the resetting movement, (arrow $r'$,) the two stop members $z'$ and $z^2$ are brought into one and the same plane, so as to come into contact with each other, as in Fig. $12^\times$, when the trip-register is brought back to zero. Each forward movement of said lever $D^2$, in addition to the disconnection of the trip-register T, the locking of the permanent register P, bell mechanism $B'$, &c., and main actuator A and the adjustment of the members $z'$ $z^2$ of the zero-stop for coaction, serves also to impart in a positive manner an initial movement, Fig. 13, to the direction-indicator D, which, as heretofore, is a four-sided prism rotating step by step in horizontal bearings 48 and 49, Fig. 5, on the bridge $B^2$ and having its successive sides provided with brief descriptions of the direction of successive trips, as "Up" and "Down." To effect said initial movement and the final movement, Fig. 15, at each actuation of the indicator, the lever $D^2$ terminates at its upper end in a rigid extension $x$, engaged locally by a pressing-spring $x'$ behind it and notched at its extremity to interlock with a laterally-projecting stud-pin $x^2$, Fig. 7, &c., on an escapement-lever 50 of known form. Said lever 50 oscillates on a horizontal pivot 51 parallel to the axis of the indicator, and the latter is provided with a spindle 52, which carries between the pallets of the escapement-lever a star-wheel 53. For supplementing said initial movement by an automatic secondary movement, Fig. 14, said bearing 49 is provided with a spring-pressed pallet 54, coacting with a cam portion $y$ of said star-wheel. This cam portion is shown in the plane of section in Figs. 13 to 15 and is characterized by rounded ridges to coact with the angular effective edge or face $z$ of the pallet 54, so as to cause the latter by reaction to press the star-wheel 53 and therewith the indicator D from the angular position in which they are left by a relatively short initial movement, Fig. 13, to a position, Fig. 14, from which the final movement, Fig. 15, is readily imparted by the rear pallet of the escapement-lever 50. The impulse for said final movement of the indicator is exerted by the spring $S^3$ through the shaft S, lever $D^2$, and said extension $x$, carried by the latter. The spring $x'$ serves to prevent lost motion. By the same impulse said spring $S^3$ returns the lever $D^2$ to its normal position, as aforesaid, to reëstablish the connection between the trip-register and the actuating mechanism and to restore the register as a whole to working condition with the trip-register at zero for a new trip. The flipper, (represented at F in Fig. 1,) together with its pivot 55, spring-abutment 56, and detent 57, Fig. 5, &c., is identical with the "covering-plate," Fig. 14 of said Patent No. 547,981, and its corresponding appurtenances set forth in said Patent No. 547,981 and forms no part of the present invention.

The form and construction of the case C, together with the capacity and in some cases the form of the trip-register T as regards the register-wheels $o$ and $p$ and the form and capacity of the permanent register P, may be changed at will, the flipper F may be omitted or changed, the words on the direction-indicator D will vary on different railways, and other like modifications will suggest themselves to those skilled in the art.

Having thus described said improvement, I claim as my invention and desire to patent under this specification—

1. In a fare-register of the type hereinbefore specified, the combination of an actuator, means for transmitting registering actuations therefrom including a separable connection, an alarm mechanism and permanent and trip registers so actuated, a disconnecting-lever for breaking said connection, and means for locking said actuator and therewith said bell mechanism and said permanent register when the trip-register is disconnected and for locking said lever when said actuator is out of its normal position of rest.

2. In a fare-register, the combination with a trip-register of a reciprocating actuator, intermediate mechanism for transmitting the registering actuations including a separable connection, a disconnecting-lever having a catch portion, and a double-acting lock in the form of an L-shaped lever having an overhanging end and a shoulder behind the same to coact with said catch portion, the other end of the locking-lever projecting in the path of said actuator when the trip-register is disconnected and coacting therewith to render the disconnecting-lever locked by said overhanging end when the actuator is out of its normal position of rest.

3. In a fare-register, the combination of a permanent register, a trip-register, an actuator common to both, transmitting mechanism comprising a separable connection between said trip-register and the remainder, a pressing-spring for maintaining said connection, a disconnecting-lever for breaking the connection, and a springless actuator-lock in the form of a lever having an overhanging end to coact with said disconnecting-lever.

4. In a fare-register, the combination of bell mechanism, a trip-register, an actuator common to both, transmitting mechanism comprising a separable connection between said trip-register and the remainder, a pressing-spring for maintaining said connection, a disconnecting-lever for breaking the connection, and a springless actuator-lock in the form of a lever having an overhanging end to coact with said disconnecting-lever.

5. In a fare-register of the type hereinbefore specified, the combination of an axially-movable wheel forming part of the trip-register and provided with one member of the zero-stop and a disconnecting-lever which moves said wheel axially and is provided with the other member of said zero-stop.

6. In a fare-register of the type hereinbefore specified, a disconnecting-lever provided with one member of a zero-stop in combination with a trip-register wheel provided with a zero-stop member which normally revolves clear of the stop member on said lever, and movable axially by said lever to disconnect the trip-register and bring said stop members into one and the same plane.

7. In a fare-register of the type hereinbefore specified, the combination with the disconnecting-lever of an escapement-lever actuated thereby, a direction-indicator having its spindle provided with a star-wheel constructed with a cam portion having rounded ridges, and a spring-pressed pallet coacting with said cam portion to assist the escapement-lever.

8. In a fare-register, the combination of a direction-indicator rotating step by step on a horizontal spindle which carries a star-wheel having a cam portion with rounded ridges, an escapement-lever oscillating on a pivot parallel to said spindle, means for oscillating the escapement-lever to effect the initial and final movements of the indicator, and a spring-pressed pallet coacting with said cam portion to effect an intermediate secondary movement.

9. In a fare-register of the type hereinbefore specified, the combination with a disconnecting-lever having an actuator extension of a direction-indicator having its spindle provided with a star-wheel comprising a cam portion with rounded ridges, an escapement-lever worked by said extension and coacting with said star-wheel to effect the initial and final movements of the indicator, a spring-pressed pallet coacting with said cam portion to effect a secondary intermediate movement of the indicator, and a spring coacting with said extension, substantially as hereinbefore specified.

ANTON E. NIELSEN.

Witnesses:
WALTER BRYERS,
EDWARD F. WICKWIRE.